United States Patent
de Heer et al.

(10) Patent No.: US 7,796,506 B2
(45) Date of Patent: Sep. 14, 2010

(54) LOAD BALANCING NETWORK USING ETHERNET BRIDGES

(75) Inventors: Arjan de Heer, Hengelo (NL); Ronald van Haalen, Nijmegen (NL)

(73) Assignee: Alcatel-Lucent USA Inc., Murray Hill, NJ (US)

(*) Notice: Subject to any disclaimer, the term of this patent is extended or adjusted under 35 U.S.C. 154(b) by 561 days.

(21) Appl. No.: 11/237,440

(22) Filed: Sep. 28, 2005

(65) Prior Publication Data

US 2007/0071011 A1 Mar. 29, 2007

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)
*H04L 12/56* (2006.01)
*G06F 15/16* (2006.01)

(52) U.S. Cl. .................................. 370/229; 370/400

(58) Field of Classification Search ............... 370/217, 370/218, 219, 220, 221, 222, 223, 224, 225, 370/226, 227, 228
See application file for complete search history.

(56) References Cited

U.S. PATENT DOCUMENTS

| 6,580,715 | B1* | 6/2003 | Bare | 370/396 |
| 7,173,934 | B2* | 2/2007 | Lapuh et al. | 370/392 |
| 2002/0009084 | A1* | 1/2002 | Kalkunte | 370/391 |
| 2005/0185584 | A1 | 8/2005 | Nagesh et al. | 370/235 |
| 2006/0198323 | A1* | 9/2006 | Finn | 370/256 |

OTHER PUBLICATIONS

Justin Menga, CCNP Self-Study CCNP Practical Studies: Switching, Oct. 8, 2003, Cisco Press, Scenario 3-4: Configuring EtherChannel.*
Author Unknown, The Nortel Network Design Guidelines, Aug. 2000, pp. 71-134.*
Author Unknown, Configuring VLANs, Spanning Tree and Link Aggregation, Nortel Networks, Feb. 2005, pp. 306-312.*
Project No. P802.1ao, IEEE-SA Standards Board, Project Authorization Request (PAR) Form, Jun. 7, 2005.

* cited by examiner

*Primary Examiner*—Daniel J. Ryman
*Assistant Examiner*—Christopher Crutchfield
(74) *Attorney, Agent, or Firm*—Wall & Tong LLP (57) ABSTRACT

Ethernet hardware is configured to realize a load balancing network by using Ethernet bridging hardware that is VLAN-aware.

10 Claims, 7 Drawing Sheets

LOAD BALANCING NETWORK USING ETHERNET BRIDGES

FIELD OF THE INVENTION

The present invention relates generally to the field of data networking and, in particular, relates to load balancing in Ethernet networks.

BACKGROUND OF THE INVENTION

Realization of a load balanced network architecture has required new, dedicated hardware. However, it is desirable to achieve load balancing without adding hardware to an existing Ethernet network.

SUMMARY

Various deficiencies of the prior art are addressed by various exemplary embodiments of the present invention of configuring existing Ethernet hardware to realize a load balancing network.

One embodiment is a method for load balancing. An Ethernet network is interconnected and configured to send traffic in a substantially load balanced way. The Ethernet network includes a number of bridges and each bridge has a number of logical ports. The Ethernet network has a distribution mechanism. Each logical port of each bridge in the Ethernet network is configured with a port VLAN ID (PVID), a VLAN member set, and a set of VLANs for which frames are sent untagged. Another embodiment is a computer readable medium storing instructions for performing this method for load balancing.

Another embodiment is a system for load balancing that includes an Ethernet network and a network management system. The Ethernet network includes a number of bridges that are interconnected, where each bridge has a number of logical ports. The Ethernet network bridges are capable of performing link aggregation. The network management system configures each logical port of each bridge in the Ethernet network with a port VLAN ID (PVID), a VLAN member set, and a set of VLANs for which frames are sent untagged. The Ethernet network sends traffic in a substantially load balanced way.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily described within the general context of embodiments of a method of configuring existing Ethernet hardware to realize a load balancing network, however, those skilled in the art and informed by the teachings herein will realize that the invention is applicable generally to load balancing in many different kinds of networks in the present and in the future, not only Ethernet, IP over optical, or Ethernet over MPLS, but also even more generic Ethernet over foo, and in general foo over foo.

One embodiment is a method of configuring existing Ethernet hardware in a non-standard way to realize a load balancing network. This embodiment includes Ethernet bridging hardware that is virtual local area network-(VLAN)-aware (IEEE 802.1Q) and includes a mechanism to distribute frames over different physical ports. Some examples include an algorithm in the logical port that distributes frames round robin, performing link aggregation (IEEE 802.3ad), and the like.

Figure 1:
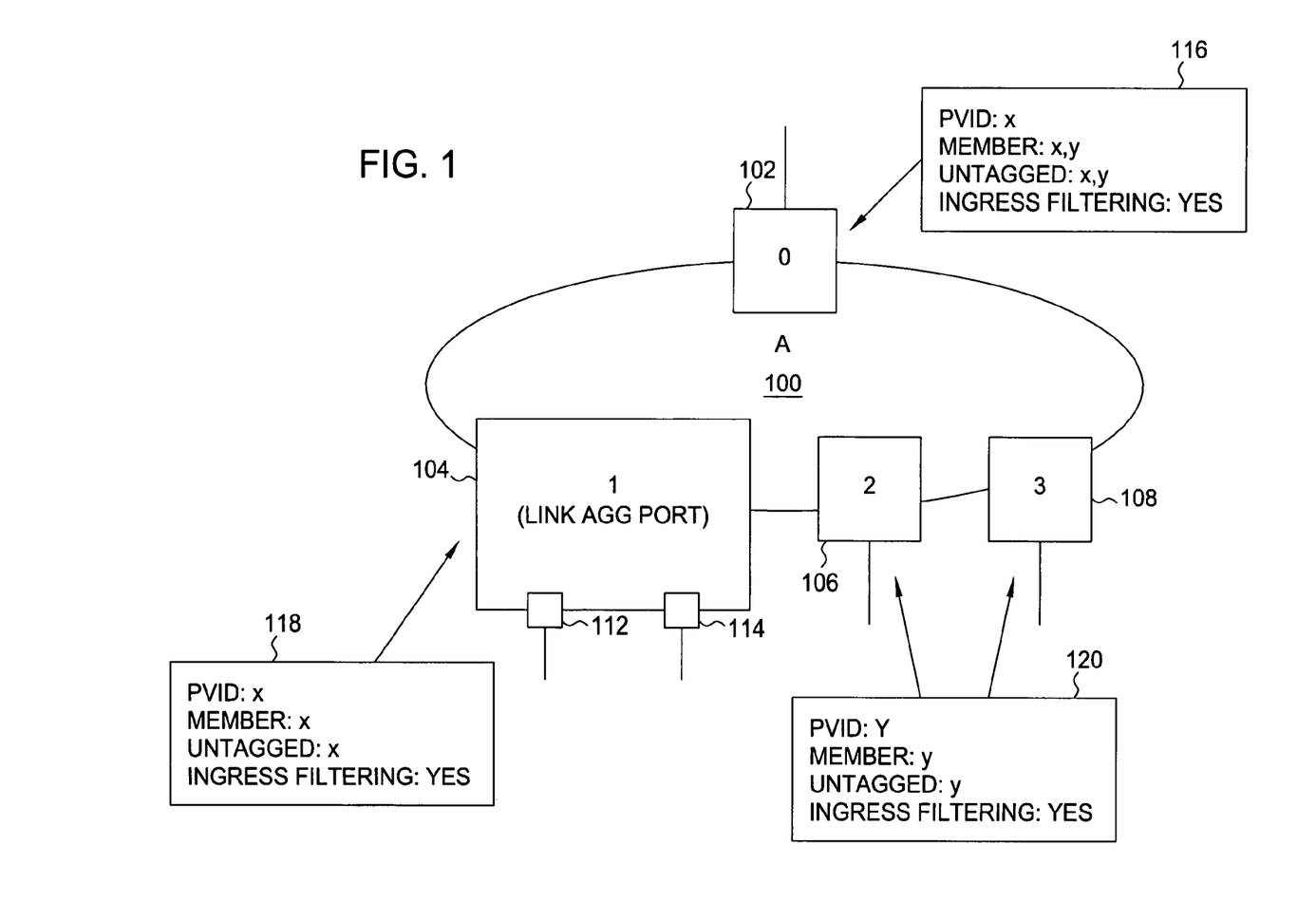
FIG. 1 is a block diagram showing an exemplary embodiment of an Ethernet bridge.

FIG. 1 shows an exemplary embodiment of an Ethernet bridge. Of course, exemplary embodiments of load balancing networks may have any number of ports and nodes. FIG. 1 shows bridge A 100, which four logical ports: logical port zero 102, logical port one 104, logical port two 106, and logical port three 108. Links connect the logical ports 102, 104, 106, 108. Logical port zero 102 is an ingress port to the load balancing network. Logical port one 104 is a special kind of port, a link aggregation port. A link aggregation port aggregates two physical ports into a single logical port. This means logical port one 104 has two physical ports 112, 114 that are logical seen as one port in that the link aggregation port decides between the physical ports when sending a packet (a/k/a frame). Other than the link aggregation port, logical port one 104, the other ports 102, 106, 108 are both logical and physical ports.

In FIG. 1, bridge A 100 is switching between all the ports 102, 104, 106, 108 and the link aggregation port is distributing its traffic over its two physical ports 112, 114 according to some distribution algorithm. The distribution algorithm can be round robin, for example, or a hash can be calculated over some part of the frame, for determining the physical port to forward a frame on.

In this example, two VLANs are created on bridge A 100, one having port zero 102 and port one 104 as a members, called VLAN x, and another having ports zero 102, two 106, and three 108 as members, called VLAN y. Port zero 102 is a member of both VLANs x and y. Of course, in other exemplary embodiments, other and different VLANs may be created for particular network architectures. For each port, a port VLAN ID (PVID) is created. Other embodiments may create more PVIDs than shown in this example. This PVID determines how the frames are classified when they arrive untagged (or zero tagged) at that port. The PVID determines which VLAN ID (VID) an untagged frame is assigned. For ports zero 102 and one 104, the PVID is x. For ports two 106 and three 108, the PVID is y. As a consequence, all untagged traffic arriving at port zero 102 may be forwarded to port one 104 and vice-versa. Traffic arriving at port two 106 may be forwarded to port zero 102 or three 108 and traffic arriving at port three 108 may be forwarded to port zero 102 or two 106. Frames (a/k/a packets) are transmitted untagged on all ports. A tag is removed before sending a frame at one port so that the frame arrives at the next port untagged. For example, frames with VLAN ID y that are to be sent out on port zero 102 or on port one 104 have their tag removed, as indicated by the untagged parameter in FIG. 1. This parameter lists the VLANs for which the frames are sent out after removal of the tag. Other embodiments may list more VIDs in the untagged parameter than shown in this example.

An Ethernet frame optionally includes an IEEE 802.1Q tag identifying which VLAN it belongs to (i.e., the VLAN ID (VID)). The VID for untagged frames is determined by the VLAN information 116, 118, 120 associated with the port 102, 104, 106, 108. In FIG. 1, port zero 102 has associated VLAN information 116 that includes PVID: x, member: x, y, untagged: x, y and ingress filtering: yes. Port one 104 has associated VLAN information 118 that includes PVID: x, member: x, untagged: x, and ingress filtering: yes. Ports two 106 and three 108 have associated VLAN information 120 that includes PVID: y, member: y, untagged: y, and ingress filtering: yes. Whether the value of the ingress filtering parameter is yes or no is not relevant for the operation of the exemplary load balancing method. The ingress filtering parameter is a security setting that may prevent some unexpected behavior in case of a misconfiguration.

A packet having a particular VID can only be forwarded to another port that is a member of the VLAN having that VID. In the example shown in FIG. 1, ports zero 102 and one 104 have x as a member, while ports two 106 and three 108 only have y as a member. To illustrate, if a packet having a VID of x arrives at port zero 102, then it may be forwarded to port one 104, because port one 104 is the only other port in bridge A 100 that has x as a member. If a packet having a VID of y arrives at port zero 102, then it may be forwarded to either port two 106 or three 108, because ports two 106 and three 108 both have y as a member. Other embodiments may create more members than shown in this example.

When ingress filtering is enabled, ports are forced to examine VLAN membership before forwarding a packet. If ingress filtering is not enabled, forwarding occurs without regard to VLAN membership according to Ethernet practices. In this exemplary embodiment ingress filtering is enabled on all the ports of all the bridges in the network in order to achieve load balancing. In this embodiment, VLAN membership is established when the network is configured in such a way that load balancing occurs, as illustrated in the following figures.

Figure 2:
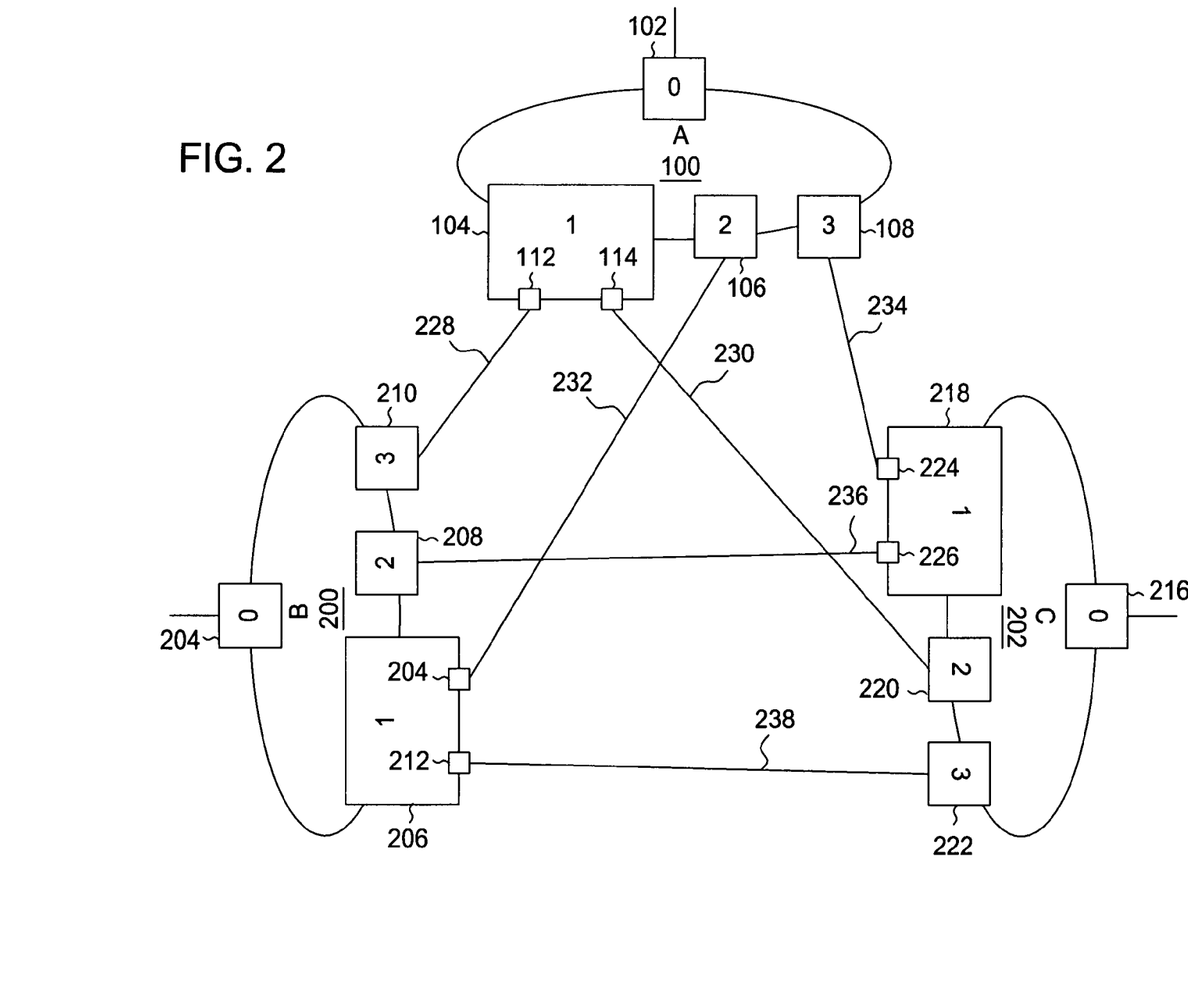
FIG. 2 is a block diagram showing an exemplary embodiment of a load balancing network having multiple Ethernet bridges.

FIG. 2 shows an exemplary embodiment of a load balancing network having multiple Ethernet bridges. In this exemplary embodiment, three bridges, bridge A 100, bridge B 200, and bridge C 202 are configured as in FIG. 1 and interconnected to form a load balancing network. Of course, other embodiments can have any number of bridges. Each bridge has a link aggregation port (e.g., port one 104 in bridge A 100) that includes physical ports for each of the other nodes. For example, in a network with 5 bridges, there are 4 other bridges, so each bridge needs 4 physical ports to be aggregated in a logical port. It is also possible to have more bridges that are not part of the load balancing network, in some embodiments. One example is an extra port connecting to a non-load balancing bridge. Each one of these physical ports is connected to a normal (i.e., non-aggregated) port of another node. As a result, from all the physical ports of the link aggregation port there is exactly one physical port connected to a normal port at each other node. By applying this pattern of interconnection for every bridge in the network along with other configuration, the load balancing behavior shown in FIGS. 3-6 is achieved.

In FIG. 2, bridge A 100, bridge B 200, and bridge C 202 are interconnected as follows. A link 228 connects bridge A 100, port one 104, physical port 112 to bridge B 200, port three 210. A link 230 connects bridge A, port one 104, physical port 112 to bridge C 202, port two 220. A link 232 connects bridge A 100, port two 106 to bridge B 200, port one 206, physical port 214. A link 234 connects bridge A 100, port three 108 to bridge C, port one 218, physical port 224. A link 236 connects bridge C 202, port two 220 to bridge A 100, port one 104, physical port 114. A link 238 connects bridge C 202, port three 222 to bridge B, port one 206, physical port 212. Alternate interconnections are possible. For example, link 228 could connect bridge A 100, port one 104, physical port 112 to bridge B 200, port two 208, link 230 could connect bridge A 100, port one 104, physical port 114 to bridge C 202, port three 222, link 236 could connect bridge C 202, port one 218, physical port 226 to bridge B 200, port three 210, and link 238 could connect bridge C 202, port two 220 to bridge B 200, port one 206, physical port 212, with links 232 and 234 remaining the same. With alternate interconnections, the paths of the packets would be different, but load balancing would still be achieved.

Figure 3:
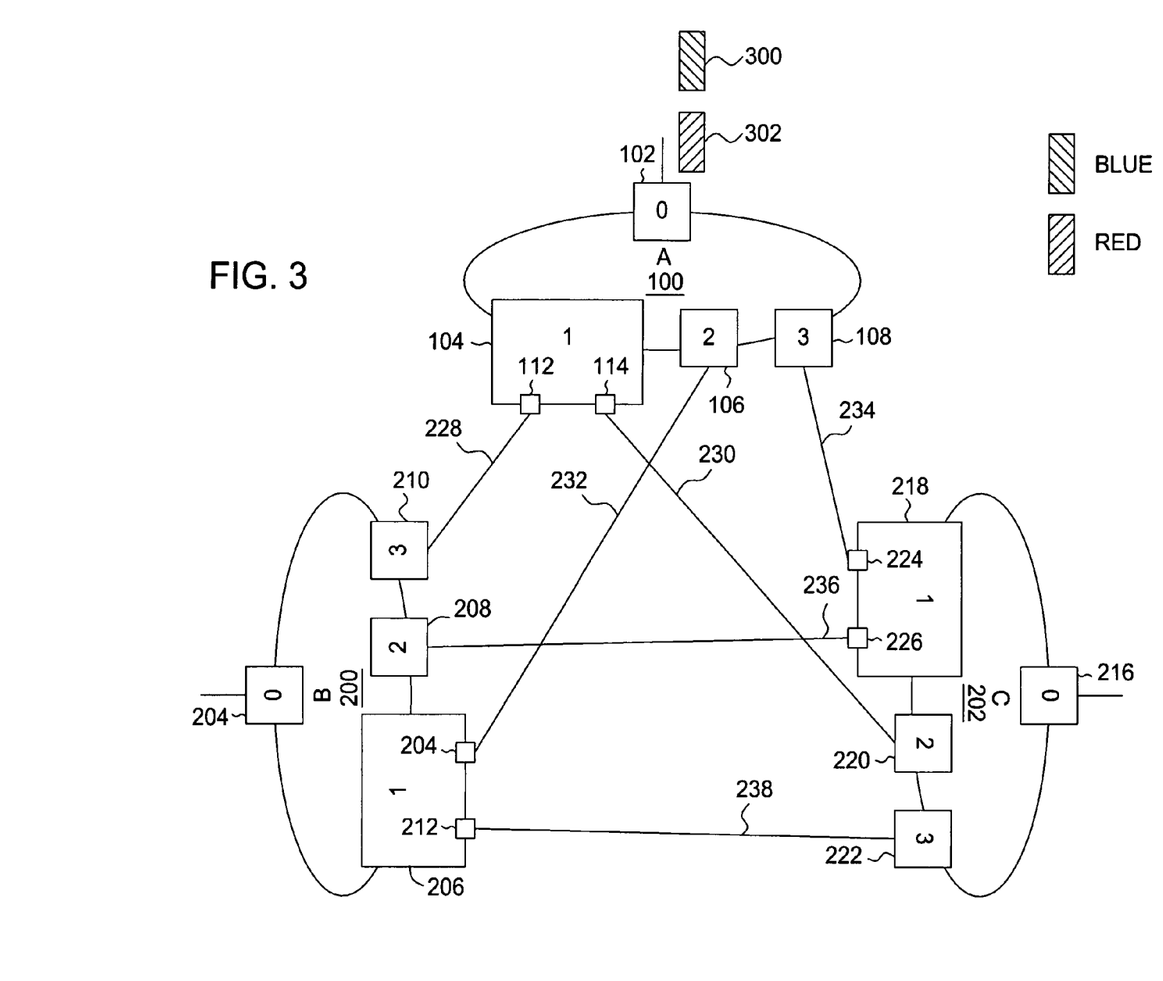
FIGS. 3, 4, 5, and 6 are block diagrams showing the behavior of the exemplary embodiment of the load balancing network of FIG. 2.
Figure 4:
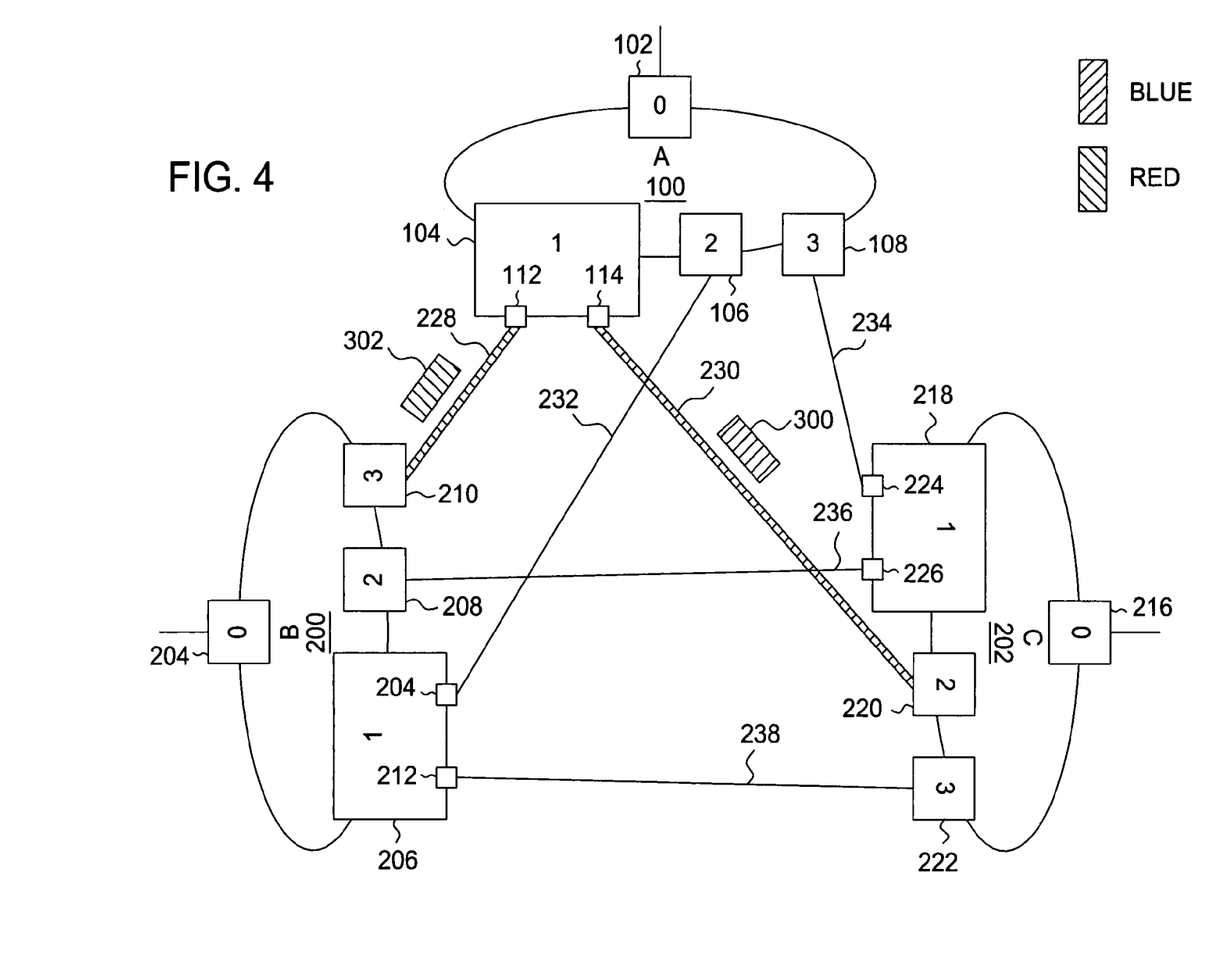

FIGS. 3-6 show the behavior of the exemplary embodiment of the load balancing network of FIG. 2. FIG. 3 shows two packets, a blue packet 300 and a red packet 302, arriving at bridge A 100. Both the packets 300, 302 are destined for bridge B 200, but take different paths through the network. As the packets 300, 302 arrive at port zero 102 of bridge A 100, the packets 300, 302 are classified into VLAN x. The only other port that is a member of VLAN x is port one 104. The packets 300, 302 are forwarded to port one 104. As port one 104 is a logical link aggregation port, port one 104 distributes the traffic over its physical ports 112, 114 so that the packets 300, 302 can be sent over different links, as shown in FIG. 4. FIG. 4 shows that the blue packet 300 is sent via link 230 from the right physical port 114 of bridge A 100 to port two 220 of bridge C 202 and the red packet is sent via link 228 from the left physical port 112 of bridge A 100 to port three 210 of bridge B 200.

Figure 5:
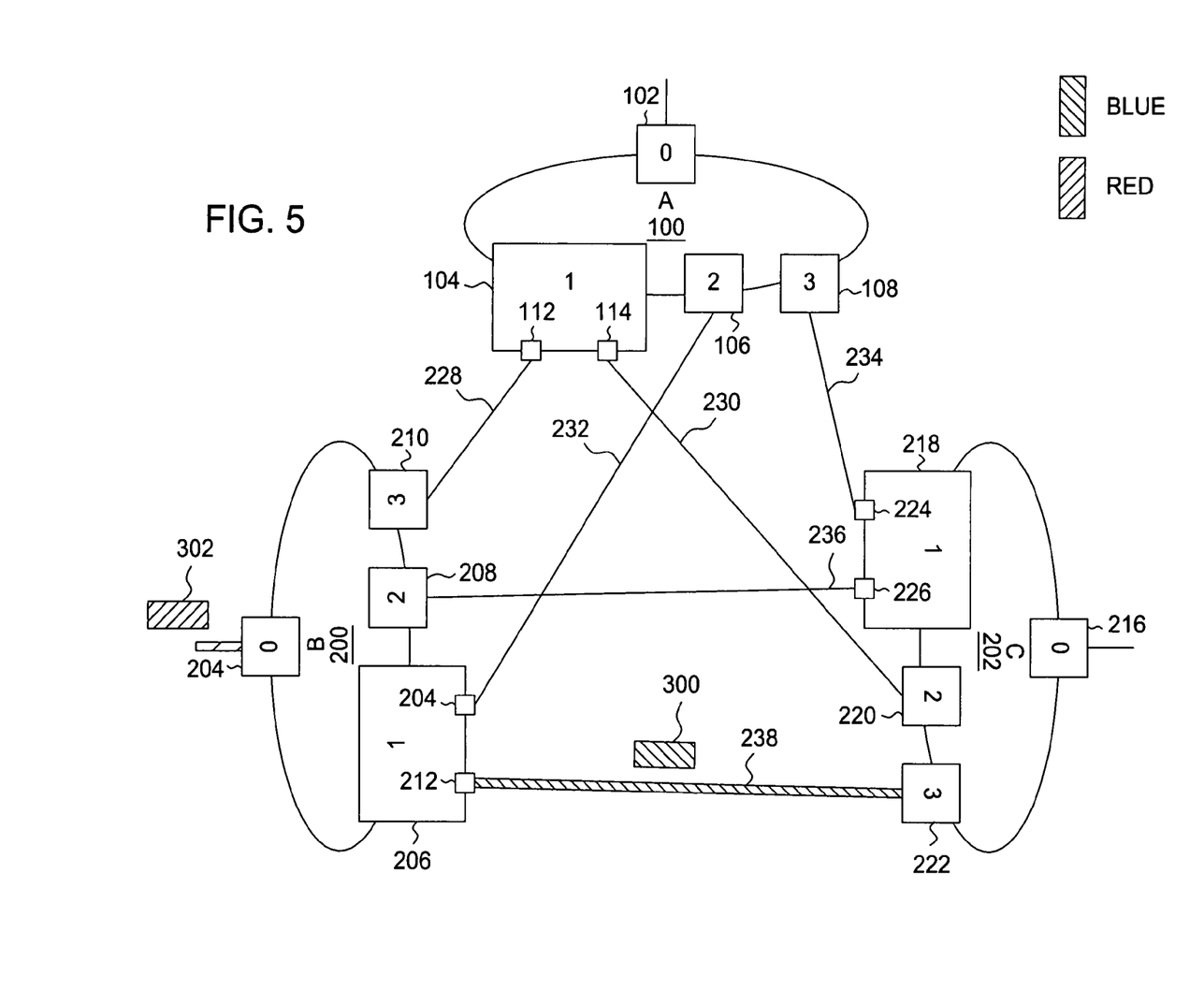

In FIG. 5, the packets 300, 302 arrive at bridges B 200 and C 202 and are then classified into VLAN y. VLAN y is the local value for y. In other words, the definition of VLAN y at bridge B 200 is not necessarily the same as the definition of VLAN y at bridge C 202. At bridge B 200, the red packet 302 is forwarded to port zero 204, which is the destination of the red packet 302. At bridge C 202, the blue packet 300 is forwarded from port two 220 to port three 222 and, then via link 328, to port one 206 of bridge B, which is the destination of the blue packet 300.

For both packets 300, 302, the receiving ports associate the source address of the received frame with the port it was received on for VLAN y. At bridge B 200, the association is made with port three 210. At bridge C 202, the association is made with port two 220. If, for example, bridge C 202 did not know whether the destination (as identified with the destination address in the packet) was reachable via port three, bridge C would flood the packet within VLAN y. In that case, the packet would be forwarded both via port three 222 and port zero 216.

Figure 6:
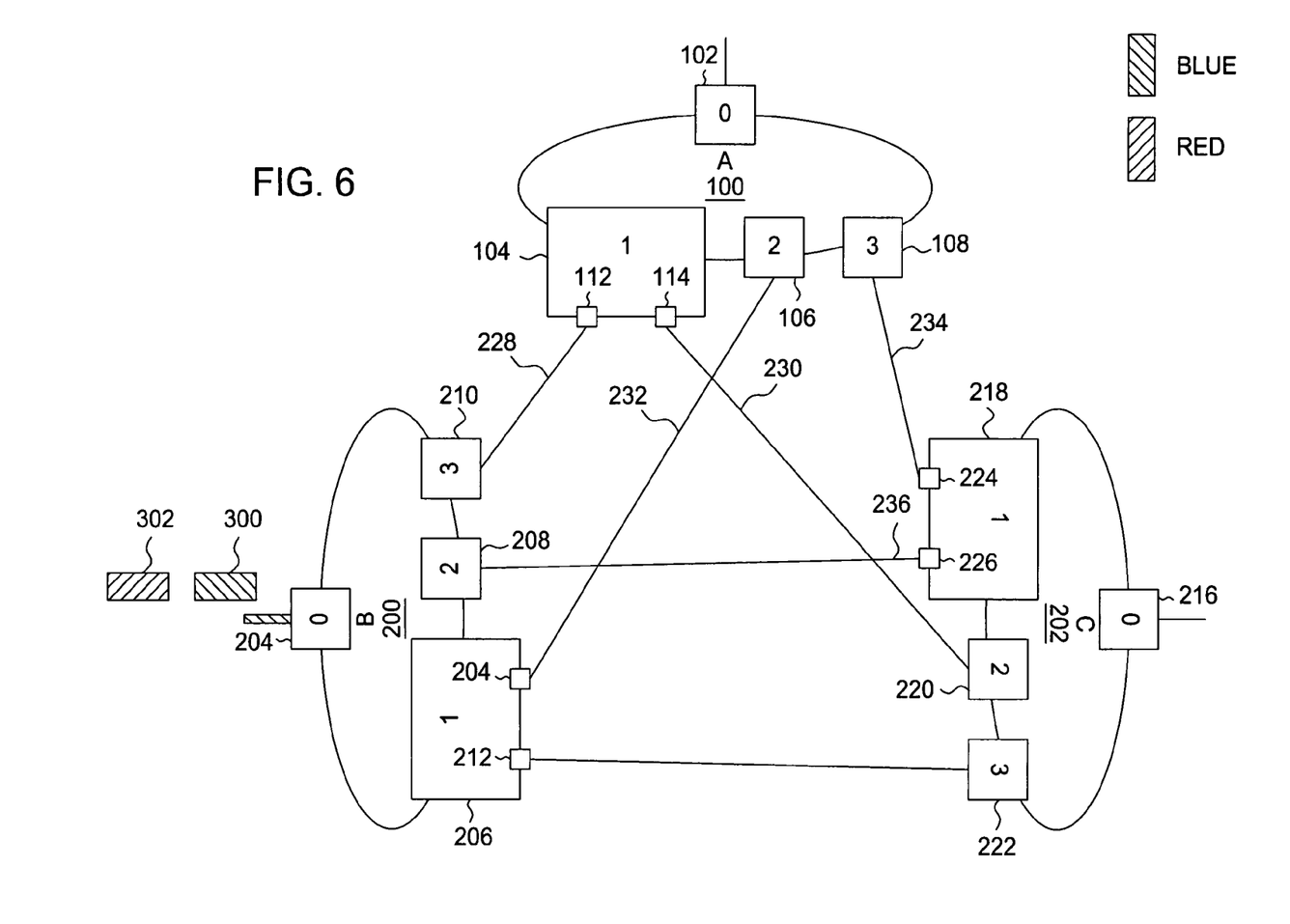

In FIG. 6, the blue packet 302 arrives at bridge B 200 from bridge C 202 and is classified into VLAN x and, as a result, can only be forwarded to port zero 204.

In some cases, the load balancing architecture may lead to reordering of packets. In some embodiments, this is addressed by a reordering buffer at the destination bridge (bridge B in this example). A reordering buffer is not typically available in existing Ethernet equipment. However, if a link-aggregation port performs a hash-based distribution algorithm (as opposed to a round-robin distribution algorithm), then careful selection of the hash function prevents reordering. One such algorithm calculates a value based on the Ethernet source and/or destination address, or the IP addresses inside the packet. This same technique is used in the link-aggregation protocol to address reordering. There is still reordering, but it does not do any harm, i.e. it will not change the order of frames that have the same destination and source. In typical existing Ethernet equipment, link aggregation is controlled by the link aggregation protocol. Exemplary embodiments permit link aggregation to be turned on or off in software, independent of the link aggregation protocol.

An exemplary embodiment of a method of configuring existing Ethernet hardware to realize a load balancing network includes manual configuration or automatic configuration by software in a network management system. Parameters are set for each node in the network as illustrated in the example network of FIG. 1 and nodes are interconnected in a topology such as that illustrated in the example network of FIG. 2.

Exemplary embodiments have many advantages, including being implementable on existing Ethernet hardware, without needing any new hardware. This is a less costly solution and can be implemented on many existing Ethernet networks. Adding load balancing increases the reliability and efficiency of existing Ethernet networks. In addition, new Ethernet network hardware can implement load balancing, such as a chip with a load balancing feature within each bridge.

Figure 7:
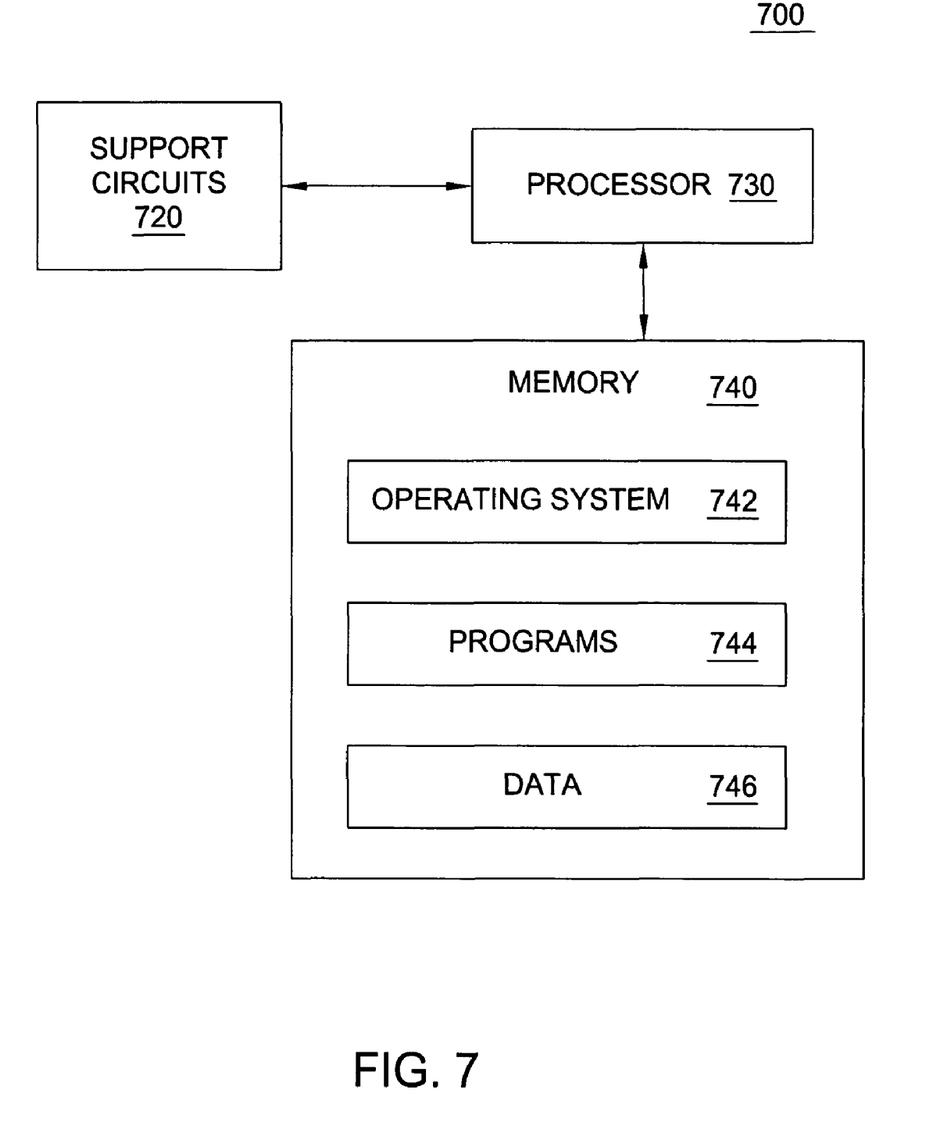
FIG. 7 is a high level block diagram showing a computer.

FIG. 7 is a high level block diagram showing a computer. The computer 700 may be employed to implement embodiments of the present invention. The computer 700 comprises a processor 730 as well as memory 740 for storing various programs 744 and data 746. The memory 740 may also store an operating system 742 supporting the programs 744.

The processor 730 cooperates with conventional support circuitry such as power supplies, clock circuits, cache memory and the like as well as circuits that assist in executing the software routines stored in the memory 740. As such, it is contemplated that some of the steps discussed herein as software methods may be implemented within hardware, for example, as circuitry that cooperates with the processor 730 to perform various method steps. The computer 700 also contains input/output (I/O) circuitry that forms an interface between the various functional elements communicating with the computer 700.

Although the computer 700 is depicted as a general purpose computer that is programmed to perform various functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware, or a combination thereof.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other signal bearing medium, and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for load balancing of an Ethernet network, the method comprising:
configuring each bridge of a portion of the Ethernet network to provide for load-balanced distribution of network traffic over the Ethernet network portion, the Ethernet network portion comprising a plurality of bridges and links connecting the plurality of bridges, wherein each bridge of the Ethernet network portion comprises:
one or more ingress logical ports;
a plurality of regular ports, each regular port comprising a physical and logical port, and
at least one link aggregation logical port comprising a plurality of physical ports wherein each of the regular ports on each bridge is connected to one of the plurality of physical ports of one of the at least one link aggregation logical ports of a different bridge; and
wherein the step of configuring each bridge further comprises:
associating a plurality of different VLANs with the bridge,
configuring each logical port of the bridge with a Port VLAN ID (PVID), wherein the PVID defines a VLAN ID (VID) for classifying untagged frames and zero tagged frames arriving at the logical port and
assigning each logical port of the bridge to a VLAN member set identifying one or more of the plurality VLANs such that at least two logical ports of the bridge are assigned different VLAN member sets; and
wherein the step of configuring each logical port of the bridge with a Port VLAN ID (PVID) comprises creating distinct VLANs comprising separate groupings with the one or more ingress logical ports being common to each grouping and
said groupings prevent traffic received at the one or more ingress logical ports and the at least one link aggregation logical port of a bridge from being forwarded to the plurality of regular ports and prevent traffic received at the plurality of regular ports from being forwarded to the at least one link aggregation logical port.

2. The method of claim 1, further comprising enabling ingress filtering for the one or more ingress logical ports, the regular logical ports and the at least one link aggregation logical port of each bridge in the Ethernet network portion.

3. The method of claim 1, wherein the one or more ingress logical ports, the regular logical ports and the at least one link aggregation logical port of the bridge are configured to forward a frame associated a particular VID only to those one or more other logical ports of the bridge that are members of a VLAN identified by that particular VID, according to VLAN member sets of the one or more other logical port.

4. A network management system adapted to perform load balancing of an Ethernet network, the system comprising:
a tangible memory; and
a processor for executing instructions received from the memory to perform thereby a method comprising:
configuring each bridge of a portion of the Ethernet network to provide for load-balanced distribution of network traffic over the Ethernet network portion, the Ethernet network portion comprising a plurality of bridges and links connecting the plurality of bridges,
wherein each bridge of the Ethernet network portion comprises:
one or more ingress logical ports;
a plurality of regular ports, each regular port comprising a physical and logical port, and
at least one aggregation logical port comprising a plurality of physical ports,
wherein each of the regular ports on each bridge is connected to one of the plurality of physical ports of one of the at least one link aggregation logical ports of a different bridge; and
wherein the step of configuring each bridge further comprises:

associating a plurality of different VLANs with the bridge, configuring each logical port of the bridge with a Port VLAN ID (PVID), wherein the PVID defines a VLAN ID (VID) for classifying untagged frames and zero tagged frames arriving at the logical port and assigning each logical port of the bridge to a VLAN member set identifying one or more of the plurality VLANs such that at least two logical ports of the bridge are assigned different VLAN member sets; and wherein the step of configuring each logical port of the bridge with a Port VLAN ID (PVID) comprises creating distinct VLANs comprising separate groupings with the one or more ingress logical ports being common to each grouping and said groupings prevent traffic received at the one or more ingress logical ports and the at least one link aggregation logical port of a bridge from being forwarded to the plurality of regular ports and prevent traffic received at the plurality of regular ports from being forwarded to the at least one link aggregation logical port.

5. The system of claim 4, further comprising: enabling ingress filtering for the one or more ingress logical ports, the regular logical ports and the at least one link aggregation logical port of each bridge in the Ethernet network portion.

6. The system of claim 4, wherein the one or more ingress logical ports, the regular logical ports and the at least one link aggregation logical port of the bridge are configured to forward a frame associated a particular VID only to those one or more other logical ports of the bridge that are members of a VLAN identified by that particular VID, according to VLAN member sets of the one or more other logical port.

7. The system of claim 5, wherein each frame is forwarded untagged.

8. A non-transitory computer readable storage medium storing instructions for performing a method for load balancing of an Ethernet network, the method comprising:

configuring each bridge of a portion of the Ethernet network to provide for load-balanced distribution of network traffic over the Ethernet network portion, the Ethernet network portion comprising a plurality of bridges and links connecting the plurality of bridges, wherein each bridge of the Ethernet network portion comprises:

one or more ingress logical ports;

a plurality of regular logical ports, each logical port comprising a physical port, and at least one link aggregation logical port comprising a plurality of physical ports, including at least two physical ports connected to two different bridges of the Ethernet network portion wherein each of the regular ports on each bridge is connected to one of the plurality of physical ports of one of the at least one link aggregation logical ports of a different bridge; and wherein the configuring of each bridge further comprises:

associating a plurality VLANs with each bridge, configuring each logical port of the bridge with a Port VLAN ID (PVID), wherein the PVID defines a VLAN ID (VID) for classifying untagged frames and zero tagged frames arriving at the logical port and assigning each logical port of the bridge to a VLAN member set identifying one or more of the plurality VLANs such that at least two logical ports of the bridge are assigned different VLAN member sets; and wherein the step of configuring each logical port of the bridge with a Port VLAN ID (PVID) comprises creating distinct VLANs comprising separate groupings with the one or more ingress logical ports being common to each grouping and said groupings prevent traffic received at the one or more ingress logical ports and the at least one link aggregation logical port of a bridge from being forwarded to the plurality of regular ports and prevent traffic received at the plurality of regular ports from being forwarded to the at least one link aggregation logical port.

9. The computer readable medium of claim 8, the method further comprising: enabling ingress filtering for the one or more ingress logical ports, the regular logical ports and the at least one link aggregation logical port of each bridge in the Ethernet network portion.

10. The computer readable medium of claim 8, wherein the one or more ingress logical ports, the regular logical ports and the at least one link aggregation logical port of the bridge are configured to forward a frame associated a particular VID only to those one or more other logical ports of the bridge that are members of a VLAN identified by that particular VID, according to VLAN member sets of the one or more other logical port.

* * * * *